(12) United States Patent
Theunissen et al.

(10) Patent No.: US 10,000,671 B2
(45) Date of Patent: Jun. 19, 2018

(54) ELECTRICALLY CONDUCTIVE ADHESIVES COMPRISING AT LEAST ONE METAL PRECURSOR

(71) Applicant: Henkel AG & CO. KGAA, Duesseldorf (DE)

(72) Inventors: Liesbeth Theunissen, Wilsele (BE); Gunther Dreezen, Balen-Olmen (BE)

(73) Assignee: HENKEL AG & CO. KGAA, Duesseldorf (DE)

( * ) Notice: Subject to any disclaimer, the term of this patent is extended or adjusted under 35 U.S.C. 154(b) by 511 days.

(21) Appl. No.: 13/838,991

(22) Filed: Mar. 15, 2013

(65) Prior Publication Data
US 2013/0224474 A1    Aug. 29, 2013

Related U.S. Application Data

(63) Continuation of application No. PCT/EP2012/052302, filed on Feb. 10, 2012.

(30) Foreign Application Priority Data

Feb. 11, 2011  (EP) .................................... 11154150

(51) Int. Cl.
| | | |
|---|---|---|
| C09J 9/02 | (2006.01) | |
| C09J 5/06 | (2006.01) | |
| C09J 11/04 | (2006.01) | |
| H01B 1/22 | (2006.01) | |
| C08K 3/08 | (2006.01) | |
| C08K 5/098 | (2006.01) | |

(52) U.S. Cl.
CPC .  *C09J 9/02* (2013.01); *C09J 5/06* (2013.01); *C09J 11/04* (2013.01); *H01B 1/22* (2013.01); *C08K 3/08* (2013.01); *C08K 5/098* (2013.01); *C08K 2201/001* (2013.01); *C09J 2433/00* (2013.01); *C09J 2463/00* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 4,607,091 A | 8/1986 | Schreiber | |
| 5,021,484 A | 6/1991 | Schreiber et al. | |
| 5,200,452 A | 4/1993 | Schreiber | |
| 5,733,954 A | 3/1998 | McKenzie et al. | |
| 5,789,498 A | 8/1998 | Ohnishi et al. | |
| 5,798,399 A | 8/1998 | Griggs et al. | |
| 5,801,218 A | 9/1998 | McKenzie et al. | |
| 6,825,570 B2 | 11/2004 | Jiang et al. | |
| 8,110,254 B1 * | 2/2012 | Sharma ................. | H05K 3/182 427/126.1 |
| 8,293,365 B2 | 10/2012 | Li | |
| 2003/0148024 A1 * | 8/2003 | Kodas et al. ................. | 427/125 |
| 2007/0096062 A1 * | 5/2007 | Kodas ..................... | C23C 18/06 252/500 |
| 2009/0302280 A1 * | 12/2009 | Simone et al. ............... | 252/512 |
| 2010/0209690 A1 | 8/2010 | Sang et al. | |
| 2010/0285309 A1 * | 11/2010 | Barriau ................ | C08G 59/066 428/336 |

FOREIGN PATENT DOCUMENTS

| | | |
|---|---|---|
| CN | 101781541 A | 7/2010 |
| JP | 61062558 A | 3/1986 |
| JP | 05121465 A | 5/1993 |
| JP | 06157876 A | 6/1994 |
| JP | 08511570 A | 12/1996 |
| JP | 10502677 A | 3/1998 |
| JP | 2003309352 A | 10/2003 |
| JP | 2004197030 A | 7/2004 |
| JP | 2006032165 A | 2/2006 |
| JP | 2006049147 A | 2/2006 |
| JP | 2006056951 A | 3/2006 |
| JP | 2008208442 A | 9/2008 |
| JP | 2010044967 A | 2/2010 |
| WO | 2008048207 A2 | 4/2008 |

\* cited by examiner

*Primary Examiner* — Katie L Hammer
(74) *Attorney, Agent, or Firm* — Steven C. Bauman

(57) ABSTRACT

The present invention relates to thermally curable adhesives that are suitable for use as electrically conductive materials in the fabrication of electronic devices, integrated circuits, semiconductor devices, passive components, solar cells, solar modules, and/or light emitting diodes. The thermally curable adhesives comprise at least one thermosetting resin, electrically conductive particles having an average particle size of 1 μm to 50 μm, and at least one metal precursor, wherein the metal precursor decomposes substantially to the corresponding metal during the thermal curing of the thermally curable adhesive.

16 Claims, No Drawings

ELECTRICALLY CONDUCTIVE ADHESIVES COMPRISING AT LEAST ONE METAL PRECURSOR

BACKGROUND OF THE INVENTION

The present invention relates to thermally curable adhesives. In particular, the present invention relates to thermally curable adhesives that are suitable for use as electrically conductive materials in the fabrication of electronic devices, integrated circuits, semiconductor devices, passive components, solar cells, solar modules, and/or light emitting diodes.

Electrically conductive materials are used for a variety of purposes in the fabrication and assembly of electronic devices, integrated circuits, semiconductor devices, passive components, solar cells, solar modules, and/or light emitting diodes.

In general, electrically conductive adhesives (ECAs) provide a mechanical bond between two surfaces and conduct electricity. Typically, ECA formulations are made of a polymer resin filled with electrically conductive metal fillers. The resin generally provides a mechanical bond between two substrates, while the electrically conductive fillers generally provide the desired electrical interconnection.

For instance, WO 2008/048207 A2 discloses electrically conductive adhesive compositions having cured low modulus elastomer and metallurgically-bonded micron-sized metal particles and nanosized metal particles. Said electrically conductive adhesive compositions often exhibit rather high processing viscosities, low storage stabilities and/or an insufficient electrical conductivity.

As electronic devices and the corresponding connecting areas between components and substrates are becoming continuously smaller, there is a need for electrically conductive materials, such as electrically conductive adhesives, that can provide an improved electrical interconnection between small contact areas.

Additionally, it would be desirable to provide ECAs, which exhibit a low processing viscosity, and a low processing temperature. Moreover, a particular challenge with electrically conductive adhesives is implementing the appropriate balance of filler loading, adhesive strength, curing speed, electrical conductivity and stable electrical contact resistance.

Hence, there is a need for new electrically conductive adhesives that provide an improved electrically conductive interconnection between small contact areas, such as metallic electrodes, a low processing viscosity, and a low processing temperature.

BRIEF SUMMARY OF THE INVENTION

The present invention provides a thermally curable adhesive and the cured product of said adhesive which both have electrically conducting properties. The thermally curable adhesive of the present invention can preferably be cured in about 0.1 to 180 minutes at a temperature within the range of about 50° C. to about 250° C., wherein said adhesive exhibits a low processing viscosity, and a low processing temperature.

When cured, the cured products are characterized by their good adhesion, and high electrical conductivity. Additionally, the cured product of the thermally curable adhesive of the present invention allows to form an electrically conductive interconnection between two surfaces, wherein said interconnection exhibits a low and long-term stable electrical contact resistance.

In one aspect the present invention relates to a thermally curable adhesive, comprising a) at least one thermosetting resin, b) electrically conductive particles having an average particle size of 1 µm to 50 µm, and c) at least one metal precursor, wherein the metal precursor decomposes substantially to the corresponding metal during the thermal curing of the thermally curable adhesive.

The at least one metal precursor used in the present invention decomposes substantially to the corresponding metal in a decomposition process during the thermal curing of the thermally curable adhesive. Under preferred conditions metallic nanoparticles are formed in the course of this decomposition process, wherein said metallic nanoparticles preferably have an average particle size in the range of about 2 nm to about 800 nm, more preferably in the range of about 20 nm to about 200 nm and particularly preferably in the range of about 25 nm to about 100 nm.

DETAILED DESCRIPTION OF THE INVENTION

The term "decomposes substantially", as used in the present invention, means that the metal precursor decomposes to the corresponding metal in an amount sufficient to decrease the electrical contact resistance of the cured product of the adhesive of the present invention by at least 10%, preferably by at least 40%, particularly preferably by at least 80%, and more particularly preferably by at least 90%, compared to the cured product of an identical formulation which does not comprise the metal precursor, with the proviso that in both cases the contact resistance is determined under identical conditions.

The contact resistance is preferably determined as indicated in the examples.

Normally, it is very difficult to keep metallic nanoparticles stable in an adhesive formulation, because said particles tend to agglomerate which often necessitates the inclusion of a suitable stabilizer. In addition metallic nanoparticles could cause an undesirable increase in viscosity. Due to the in-situ formation of the metal from the metal precursor and due the good compatibility of said precursors with the thermosetting resin component, the thermally curable adhesives of the present invention have a low processing viscosity and do not require large amounts of stabilizers to minimize agglomeration processes.

The invention also provides a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the thermally curable adhesive of the present invention.

The term "thermosetting resin", as used herein, refers to any precursor which may be suitable for producing thermosetting plastics and/or thermosets such as, for example, monomers, oligomers or prepolymers made from natural or synthetic, modified or unmodified resins which are not fully cured and/or crosslinked, e.g., which are capable of being further cured and/or crosslinked using heat. Thermosetting resins can have a liquid form at 22° C. or they may be melted at relatively low temperatures, for example, below 100° C., to form liquids, which can occur without significant decomposition of the resin. The cross-linking that occurs in the curing reaction causes the linking of atoms between or across two monomers, oligomers or polymers, resulting in a three-dimensional rigidified chemical structure, wherein said rigidified chemical structures exhibit a higher molecular weight than the corresponding thermosetting resins.

The term "electrically conductive particles", as used herein, refers to any particulate material, which when added to a non-conductive resin component increases the electrical conductivity of the formed polymer composite. The electrically conductive particles can have different shapes, such as spherical and/or flake-like shapes.

As used herein, the term "average particle size" refers to the $D_{50}$ value of the cumulative volume distribution curve at which 50% by volume of the particles have a diameter less than said value. The volume average particle size or $D_{50}$ value is measured in the present invention through laser diffractometry, preferably using a Malvern Mastersizer 2000 available from Malvern Instruments Ltd.

In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or $D_{50}$ values relate to scattering measurements at an angle from 0.02 to 135 degrees relative to the incident laser beam. For the measurement it is further on preferred that a dispersion of the particles in a suitable liquid, such as acetone, is prepared by using ultrasonication. In order to produce an acceptable signal-to-noise ratio the particle concentration in the dispersion/suspension should preferably be chosen in a way that an obscuration between 6% to 20% is obtained.

The thermally curable adhesive of the present invention comprises at least one thermosetting resin, wherein thermosetting resins are preferred which have a curing temperature higher than 100° C., preferably higher than 110° C., and more preferably higher than 120° C. Suitable thermosetting resins may be selected from epoxy resins, benzoxazine resins, acrylate resins, bismaleimide resins, cyanate ester resins, polyisobutylene resins and/or combinations thereof.

The use of epoxy resins or mixtures of epoxy resins and benzoxazine resins in the adhesives of the present invention is advantageous, because said epoxy resins or said mixtures provide a good mechanical strength, and/or a high thermal stability.

Suitable epoxy resins may include multifunctional epoxy-containing compounds, such as glycidyl ethers of $C_2$-$C_{28}$ diols, $C_1$-$C_{28}$ alkyl- or poly-phenol glycidyl ethers; polyglycidyl ethers of pyrocatechol, resorcinol, hydroquinone, 4,4'-dihydroxy-diphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxy-diphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl) methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy resins suitable for use in the present invention are epoxy silicone copolymers, such as those available under the tradenames ALBIFLEX 296, ALBIFLEX 348 and ALBIFLEX 712 from Hanse Chemie, polyglycidyl derivatives of phenolic compounds, such as those available under the tradenames EPON 825, EPON 826, EPON 828, EPON 1001, EPON 1007 and EPON 1009 from Huntsman, EPICLON EXA 830 CRP, EPICLON EXA 850 CRP, EPICLON EXA 835 LVP from DIC, EPALLOY 5000, EPALLOY 5001, from CVC Chemicals, cycloaliphatic epoxy-containing compounds such as Araldite CY179 from Huntsman, EPALLOY 5200 from CVC Chemicals or CELLOXIDE 2021 P from Daicel or waterborne dispersions under the tradenames EPI-REZ 3510, EPIREZ 3515, EPI-REZ 3520, EPI-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayaku, Japan. Other suitable epoxy-containing compounds include polyepoxides prepared from polyols and the like and polyglycidyl derivatives of phenolformaldehyde novolacs, the latter of which are available commercially under the tradenames DEN 431, DEN 438, and DEN 439 from Dow Chemical Company, EPICLON N-740, EPICLON N-770, EPICLON N-775 from DIC and a waterborne dispersion ARALDITE PZ 323 from Huntsman.

Cresol analogs are also available commercially such as ECN 1273, ECN 1280, ECN 1285, and ECN 1299 or EPICLON N-660, EPICLON N-665, EPICLON N-670, EPICLON N-673, EPICLON N-680, EPICLON N-695 from DIC or waterborne dispersions ARALDITE ECN 1400 from Huntsman, Inc. SU-8 and EPI-REZ 5003 are bisphenol A-type epoxy novolacs available from Hexion.

Of course, combinations of different epoxy resins are also desirable for use herein.

It is particularly preferred to use monofunctional glycidyl ethers, polyfunctional glycidyl ethers, and/or combinations thereof as the thermosetting resin component of the present invention, because these compounds allow to formulate adhesives of the present invention which exhibit a low processing viscosity, and/or an increased resistance to thermomechanical or mechanical fatigue.

Suitable benzoxazine resins may be embraced by the following structure:

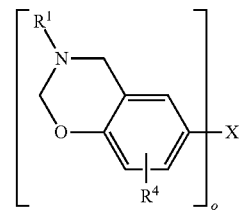

wherein o is 1 to 4, X is selected from a direct bond (when o is 2), alkyl (when o is 1), alkylene (when o is 2 to 4), carbonyl (when o is 2), oxygen (when o is 2), thiol (when o is 1), sulfur (when o is 2), sulfoxide (when o is 2), and sulfone (when o is 2), $R^1$ is selected from hydrogen, alkyl, alkenyl and aryl, and $R^4$ is selected from hydrogen, halogen, alkyl and alkenyl, or $R^4$ is a divalent residue creating a naphthoxazine residue out of the benzoxazine structure.

Alternatively, the benzoxazine resin may be embraced by the following structure:

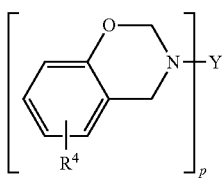

where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R^4$ is selected from hydrogen, halogen, alkyl and alkenyl, or $R^4$ is a divalent residue creating a naphthoxazine residue out of the benzoxazine structure.

Of course, combinations of different benzoxazine resins or combinations of different benzoxazine and epoxy resins are also desirable for use herein.

Benzoxazine compounds are presently available commercially from several sources, including Huntsman Advanced Materials; Georgia-Pacific Resins, Inc.; and Shikoku Chemicals Corporation, Chiba, Japan. If desired, however, instead of using commercially available sources, the benzoxazine may typically be prepared by reacting a phenolic compound, such as a bisphenol A, bisphenol F, bisphenol S or thiodiphenol, with an aldehyde and an aryl amine. See generally U.S. Pat. Nos. 4,607,091, 5,021,484, and 5200452.

In further embodiments of the present invention other resins, such as vinyl resins, phenolic resins, polyimide resins, silicon-containing resins, such as epoxy-silicone resins, and/or combinations thereof are used in combination or instead of the aforementioned resin components.

In a particular preferred embodiment the total weight of all thermosetting resin components present in the adhesive of the present invention is in the range of 3 to 25 wt %, preferably in the range of 5 to 18 wt %, more preferably in the range of 6 to 15 wt %, and particularly preferably in the range of 6 to 12 wt %, based on the total weight of the inventive adhesive.

A further component of the thermally curable adhesive of the present invention are electrically conductive particles having an average particle size of 1 μm to 50 μm. With the inclusion of electrically conductive particles having an average particle size of 1 μm to 50 μm, a combination of said particles with the metallic decomposition product of the metal precursor is obtained during the curing process of the inventive adhesive. Due to this specific combination, the thermally curable adhesives of the present invention are capable of forming a long-term stable electrical interconnection which exhibits a low electrical contact resistance.

The electrically conductive particles may be selected from metal particles, metal plated particles or metal alloy particles and/or combinations thereof, wherein the electrically conductive particles preferably comprise or essentially consist of copper, silver, platinum, palladium, gold, tin, indium, aluminum or bismuth and/or combinations thereof. Electrically conductive particles essentially consisting of silver are particularly preferred.

The term "essentially consist of", as used herein, include electrically conductive particles which comprise non-intentionally added impurities, wherein the amount of said impurities is less than 0.2 wt %, preferably less than 0.1 wt %, and more preferably less than 0.01 wt %, based on the total amount of the electrically conductive particles of the present invention.

Desirably, the plated or coated metal combinations include silver coated copper, silver coated boron nitride, and/or silver coated aluminum.

In an alternative embodiment of the present invention, the electrically conductive particles comprise or consist of carbon black, carbon fibers, graphite or metallic coated glass spheres, such as silver coated glass and/or combinations thereof.

The average particle size of the electrically conductive particles of the present invention is determined as described above. Preferably, the electrically conductive particles have an average particle size of about 3 μm to about 20 μm, and most preferably of about 4 μm to about 15 μm or of about 4 μm to about 10 μm.

The electrically conductive particles may be present in the inventive adhesive in an amount of about 70 to about 90 wt %, based on the total weight of the thermally curable adhesive of the present invention. By using an amount of about 70 to about 90 wt % of electrically conductive particles in the adhesives of the present invention, cured products of said adhesives can be obtained, which exhibit good conductivity, reduced volume resistivity and good adhesion.

In one embodiment of the present invention the electrically conductive particles are present in an amount of about 75 to about 88 wt %, and more preferably in an amount of about 80 to about 87 wt %, each based on the total weight of the thermally curable adhesive of the present invention.

In another embodiment of the present invention the electrically conductive particles are present in an amount of about 25 to about 45 vol % and more preferably in an amount of about 30 to about 44 vol %, each based on the total volume of the thermally curable adhesive of the present invention.

The electrically conductive particles are presently available commercially from several companies, such as Ferro, Technic, Ames Goldsmith, DOWA, and Metalor.

The thermally curable adhesive of the present invention further comprises at least one metal precursor which decomposes substantially to the corresponding metal during the thermal curing of the thermally curable adhesive. The metal precursor of the present invention is preferably selected from metal complexes, which comprise at least one metal atom and at least one coordinating ligand.

The coordinating ligand is preferably bonded to the metal atom through a heteroatom which provides an easily cleavable and weak link. Preferably, the coordinating ligand is a non-chelating or monodentate ligand, which means that said ligand only has one binding site which is capable of coordinatively or ionically binding to the metal atom. Due to the stability of the resulting metal complexes the use of chelating ligands, such bidentate or multidentate ligand is less preferred.

As noted above, the metal precursor used in the present invention decomposes substantially to the corresponding metal in a decomposition process during the thermal curing of the thermally curable adhesive. Preferably the decomposition temperature of said precursor is in the range of about 50° C. to about 250° C., more preferably in the range of about 70° C. to about 220° C., particularly preferably in the range of about 90° C. to about 200° C., and more particularly preferably in the range of about 120° C. to about 180° C.

Normally the inclusion of the metal precursor do not negatively effect the storage stability of the thermally curable adhesive, particularly if metal precursors are used having a decomposition temperature of more than or equal to 50° C., preferably more than or equal to 70° C., and more preferably more than or equal to 100° C.

As noted above, it is preferred that metallic nanoparticles are formed during the decomposition process from the metal precursors of the present invention. The size and distribution of the formed metallic particles, such as metallic nanoparticles can be controlled by the chemical nature of the used metal precursor.

The metal precursor of the present invention can be obtained by reacting at least one metal or metal compound with at least one heteroatom-containing ligand. The reaction temperature may widely vary but it is preferred that the reaction temperature is in the range of 0° C. to 100° C., preferably in the range of 10° C. to 50° C., and more preferably in the range of 15° C. to 35° C. to avoid the formation of unwanted side-products.

Nonrestrictive specific examples of the metal include Ag, Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac and Th or alloys thereof.

The term "metal compound", as used herein, preferably refers to metal salts, metal oxides and/or metal organic compounds that are capable of forming a thermally decomposable metal precursor in a reaction with heteroatom-containing ligands.

The metal compound can be selected from metal oxides, metal halogenides, metal cyanides, metal cyanates, metal carbonates, metal nitrates, metal nitrites, metal sulfates, metal sulfites, metal sulfides, metal phosphates, metal thiocyanates, metal chlorates, metal perchlorates, metal borates, metal fluoroborates, metal amides, metal alkoxides, metal acetylacetonates, metal carboxylates and/or mixtures or combinations thereof.

Nonrestrictive specific examples of the metal compound include copper oxide, zinc oxide, vanadium oxide, nickel sulfide, palladium chloride, copper carbonate, iron chloride, gold chloride, nickel chloride, cobalt chloride, bismuth nitrate, vanadium acetylacetonate, cobalt acetate, tin lactate, manganese oxalate, gold acetate, palladium oxalate, copper 2-ethylhexanoate, iron stearate, nickel formate, zinc citrate, bismuth acetate, copper cyanide, cobalt carbonate, platinum chloride, dimethoxyzirconium dichloride, aluminum isopropoxide, tin tetrafluoroborate, tantalum methoxide, indium acetylacetonate and/or derivatives thereof.

In one embodiment the metal used in the fabrication of the metal precursors of the present invention is silver or a silver containing alloy.

The silver containing alloy may be formed from silver and at least one metal selected from Au, Cu, Ni, Ca, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, ThMg, Ca, Sr and/or Ba.

Due to their good reactivity, it is preferred to use one or more metal monocarboxylates as metal precursor(s) in the reaction with one or more heteroatom-containing ligands. Suitable non-limiting examples of metal monocarboxylates include metal acetates, metal propionates, metal butyrates and metal benzoates.

The metal compound used in the fabrication of the metal precursors can be selected from silver compounds, wherein preferred silver compounds include silver carboxylates.

Nonrestrictive examples of such silver compounds are silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof.

Due to their good reactivity, it is preferred to use one or more silver monocarboxylates as metal precursor(s) in the reaction with one or more heteroatom-containing ligands. Suitable non-limiting examples of silver monocarboxylates include silver acetate, silver propionate, silver butyrate and silver benzoates, wherein silver acetate is particularly preferred.

Silver-containing metal precursors have been found to not only decrease effectively the contact resistivity of the cured product of the present invention, but further have the effect of not negatively affecting the viscosity of the thermally curable adhesive of the present invention.

The term "heteroatom-containing ligand" refers to any material that is capable of bonding to the metal of the metal precursor, such as a metal cation of the metal precursor, via at least one of its heteroatoms, wherein the term "heteroatom" preferably means oxygen, nitrogen or sulfur.

The heteroatom-containing ligand is preferably selected from N-donor ligands, such as primary, secondary or tertiary amines, O-donor ligands, such as carboxylates and/or S-donor ligands, such as thiols, like hydrocarbon thiols.

Suitable N-donor ligands can comprise aromatic amines, such as 2,4,6-tri(dimethylaminomethyl)phenol, oximes, methylaldoximes, hydrazones, guanidines, hydrazides, carbazones, imdiazoles, and/or amidoamines.

In one embodiment of the present invention the heteroatom-containing ligand is an amine functionalized polyether. Amine-functionalized polyethers include polyoxyalkylenamines, such as polyoxyethylene monoamines, polyoxyethylene diamines, polyoxyethylene triamines, polyoxypropylene monoamines, polyoxypropylene diamines, polyoxypropylene triamines, polyoxyethylene-polyoxypropylene monoamines, polyoxyethylene-polyoxypropylene diamines, polyoxyethylene-polyoxypropylene triamines, dimethylene glycol dipropyl amines and/or derivatives, adducts, and combinations thereof.

Commercially available examples of such amine-functionalized polyethers or polyoxyalkylenamines include those commercially available products sold under the JEFFAMINE tradename, such as JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, JEFFAMINE M600, JEFFAMINE M1000, JEFFAMINE M2005, JEFFAMINE M2070, JEFFAMINE EDR 104, JEFFAMINE SD-231, JEFFAMINE SD-401, JEFFAMINE SD-2001, and/or JEFFAMINE HK-51 1.

In another embodiment the primary N-donor ligand is selected from primary amines of formula:

$$R^a\text{-}[NH_2]_u$$

wherein u is an integer from 1 to 4, preferably u is 1 or 2, and $R^a$ is a saturated or partially unsaturated, linear, branched or cyclic hydrocarbon residue, comprising 4 to 22 carbon atoms. In a preferred embodiment $R^a$ is a linear saturated or partially unsaturated hydrocarbon residue comprising 4 to 18 carbon atoms.

Suitable primary N-donor ligands include butylamine ($C_4H_9$—$NH_2$), pentylamine ($C_5H_{11}$—$NH_2$), hexylamine ($C_6H_{13}$—$NH_2$), heptylamine ($C_7H_{15}$—$NH_2$), octylamine ($C_8H_{17}$—$NH_2$), nonylamine ($C_9H_{19}$—$NH_2$), decylamine ($C_{10}H_{21}$—$NH_2$), undecylamine ($C_{11}H_{23}$—$NH_2$), dodecylamine ($C_{12}H_{25}$—$NH_2$), tridecylamine ($C_{13}H_{27}$—$NH_2$), tetradecylamine ($C_{14}H_{29}$—$NH_2$), hexadecylamine ($C_{16}H_{33}$—$NH_2$), and/or 9-octadecenylamine ($C_{18}H_{27}$—

$NH_2$), bis(6-aminohexyl)amine, diamino cyclohexane, isophorone diamine, diethylenetriamine, ethylenediamine, and/or 1,3-diaminopropane.

In a further embodiment the secondary N-donor ligand is selected from secondary amines of formula:

wherein $R^b$ and $R^{b1}$ are independently selected from saturated or partially unsaturated, linear, branched or cyclic hydrocarbon residues, comprising 3 to 22 carbon atoms. In one embodiment $R^b$ and $R^{b1}$ are identical and are selected from linear saturated or partially unsaturated hydrocarbon residues comprising 4 to 18, preferably 5 to 10 carbon atoms.

Preferred secondary N-donor ligands include diethylamine, dipropylamine, dibutylamine, and/or dipentylamine.

The tertiary N-donor ligands may be selected from tertiary amines of formula:

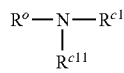

wherein $R^c$, $R^{c1}$ and $R^{c11}$ are independently selected from saturated or partially unsaturated, linear, branched or cyclic hydrocarbon residues, comprising 3 to 22 carbon atoms. In one embodiment $R^c$, $R^{c1}$ and $R^{c11}$ are identical and are selected from linear saturated or partially unsaturated hydrocarbon residues comprising 4 to 18, preferably 5 to 10 carbon atoms.

The O-donor ligands of the present invention are preferably selected from saturated or partially unsaturated fatty acids. In this context preferred O-donor ligands are selected from fatty acids, comprising 8 to 24 carbon atoms, such as caprylic acid, capric acid, lauric acid, myristic acid, palmitic acid, stearic acid, arachic acid, behenic acid, lignoceric acid, oleic acid, linoleic acid, frucid acid and/or linolenic acid.

Of course, any combination of the aforementioned metal precursors is also desirable for use herein.

In a preferred embodiment of the present invention the metal precursor is obtained by reacting at least one silver carboxylate with at least one primary N-donor ligand as shown above. More preferably the metal precursor of the present invention can be obtained by reacting silver acetate with one or more primary N-donor ligands selected from the group consisting of butylamine ($C_4H_9$—$NH_2$), pentylamine ($C_5H_{11}$—$NH_2$), hexylamine ($C_6H_{13}$—$NH_2$), heptylamine ($C_7H_{15}$—$NH_2$), octylamine ($C_8H_{17}$—$NH_2$), nonylamine ($C_9H_{19}$—$NH_2$), decylamine ($C_{10}H_{21}$—$NH_2$), undecylamine ($C_{11}H_{23}$—$NH_2$), dodecylamine ($C_{12}H_{25}$—$NH_2$), tridecylamine ($C_{13}H_{27}$—$NH_2$), tetradecylamine ($C_{14}H_{29}$—$NH_2$), hexadecylamine ($C_{16}H_{33}$—$NH_2$), and/or 9-octadecenylamine ($C_{18}H_{27}$—$NH_2$), bis(6-aminohexyl)amine, diamino cyclohexane, isophorone diamine, diethylenetriamine, ethylenediamine, and/or 1,3-diaminopropane.

In general, the metal precursor of the present invention can be obtained by reacting at least one metal or metal compound and at least one heteroatom-containing ligand in the presence of a solvent. The use of solvents in the synthesis of the metal precursors is advantageous, because said solvents help to stabilize the formed metal precursors.

Suitable solvents include 1-methyl-2-pyrrolidone, alcohols like methanol, ethanol, isopropanol and butanol, glycols like ethylene glycol, butyl diglycol, dipropylene glycol mono ethylether, butylglycolacetate and glycerine, acetates like ethyl acetate, butyl acetate and carbitol acetate, ethers like diethyl ether, tetrahydrofuran and dioxane, ketones like methyl ethyl ketone and acetone, hydrocarbons like hexane and heptane, aromatic solvents like benzene and toluene and halogen-substituted solvents like chloroform, methylene chloride and carbon tetrachloride or a mixture thereof.

If the metal precursor is prepared in the presence of an excess of a liquid heteroatom-containing ligand, it is normally not necessary to further purify the formed metal precursor. The pre-dissolved or pre-dispersed metal precursor can directly be mixed with other components to obtain the inventive adhesive in the form of a homogeneous formulation. In this context it is preferred that the metal precursor of the present invention is obtained by reacting one or more metal compounds with one or more heteroatom-containing ligands, wherein the molar ratio of all heteroatom-containing ligands to all metal compounds is greater than or equal to 2:1, more preferably greater than or equal to 3:1, and particularly preferably greater than or equal to 5:1.

In this context the term "pre-dissolved or pre-dispersed metal precursor" means that the metal precursor of the present invention is dissolved or dispersed in a liquid heteroatom-containing ligand prior to its usage in the inventive adhesive.

The term "liquid heteroatom-containing ligand", as used in the present invention, means that the heteroatom-containing ligand is a liquid at a temperature of 22° C. and 1013 mbar. The total amount of the metal precursor and of the dissolving or dispersing liquid heteroatom-containing ligand (hereinafter referred to as pre-dissolved or pre-dispersed metal precursor) may be in the range of about 0.3 to about 7 wt %, more preferably in the range of about 0.75 to about 4 wt %, and particularly preferably in the range of about 1 to about 2.5 wt %, each based on the total weight of the thermally curable adhesive of the present invention. The resulting adhesives exhibit a very low processing viscosity and the cured products thereof form interconnections having a good contact resistance.

The term "total amount" as used herein refers to sum of the amounts of the metal precursor and of the dissolving or dispersing liquid heteroatom-containing ligand used in the adhesive of the present invention.

In the adhesive of the present invention the following different combinations of electrically conductive particles and metal precursors can preferably be used:

from 70 to 90 wt % of electrically conductive particles having an average particle size of 1 μm to 50 μm and from 0.3 to 7 wt % of at least one pre-dissolved or pre-dispersed metal precursor;

from 70 to 90 wt % of electrically conductive particles having an average particle size of 3 μm to 20 μm and from 0.75 to 4 wt % of at least one pre-dissolved or pre-dispersed metal precursor;

from 70 to 90 wt % of electrically conductive particles having an average particle size of 4 μm to 15 μm and from 0.3 to 7 wt % of at least one pre-dissolved or pre-dispersed metal precursor obtained by reacting at least one silver carboxylate with at least one N-donor ligand;

from 80 to 87 wt % of electrically conductive particles having an average particle size of 1 μm to 50 μm and from 0.75 to 4 wt % of at least one pre-dissolved or pre-dispersed metal precursor;

from 80 to 87 wt % of electrically conductive particles having an average particle size of 3 μm to 20 μm and from 0.75 to 2.5 wt % of at least one pre-dissolved or pre-dispersed metal precursor;

from 80 to 87 wt % of electrically conductive particles having an average particle size of 4 μm to 15 μm and from 0.3 to 5.5 wt % of at least one metal precursor obtained by reacting at least one silver carboxylate with at least one N-donor ligand.

Depending on the at least one resin component used in the adhesive of the present invention it might be useful to include at least one additional curing agent to initiate and/or accelerate the curing process. For epoxy resins curing agents can preferably be selected from nitrogen-containing curing agents, such as primary and/or secondary amines or anhydrides.

In one embodiment of the present invention the curing agent is selected from primary or secondary amines which show blocked or decreased reactivity. The definition "primary or secondary amines which show blocked or decreased reactivity" shall mean those amines which due to a chemical or physical blocking are incapable or only have very low capability to react with the resin components, but may regenerate their reactivity without reacting with a chemical reactant which would cleave a protective group. These properties may be inherent to the amines due to physical or chemical conditions.

Primary or secondary amines which show blocked or decreased reactivity can be chemically or physically encapsulated. After liberation of the amine, e.g. by melting it at increased temperatures, by removing sheath or coatings, by the action of pressure or of supersonic waves or of other energy types, the curing reaction of the resin components starts.

In a preferred embodiment of the present invention the curing agent is selected from heat activatable curing agents or Lewis acid catalysts.

Acid and block Lewis acid catalysts are available from Sanshin Chemical Industry Co. and King Industries International. The products sold by King Industries International under the trade name NACURE and K-CURE are especially preferred in the present invention.

Examples of heat-activatable curing agent include complexes of at least one organoborane or borane with at least one amine. The amine may be of any type that complexes the organoborane and/or borane and that can be decomplexated to free the organoborane or borane when desired.

The amine may comprise a variety of structures, for example, any primary or secondary amine or polyamines containing primary and/or secondary amines. The organoborane can be selected from alkyl boranes. A particular preferred borane is boron trifluoride ($BF_3$).

Suitable amine/(organo)borane complexes are available from commercial sources such as King Industries, Air products, and ATO-Tech.

Other heat-activatable curing agents include anhydrides, guanidines, substituted guanidines, substituted ureas, melamine resins, guanamine derivatives, cyclic tertiary amines, aromatic amines and/or mixtures thereof.

Suitable anhydrides include pyromelletic dianhydride, hexahydrophtalic anhydride, methyl hexahydrophthalic anhydride, dodecenyl succinic andydride, nadic methyl anhydride and cyclohexane-1,2,4-tricarboxylic acid 1,2-anhydride and/or derivatives or combinations thereof. The aforementioned anhydrides are commercially available from several sources, such as Mitsubishi Gas Chemical company, Dixie Chemical Company and Huntsman.

In one embodiment of the invention the heat-activatable curing agent is selected from amine-epoxy adducts. Amine-epoxy adducts are well-known in the art and are described, for example, in U.S. Pat. Nos. 5,733,954, 5,789,498, 5798399 and 5,801,218, each of which is incorporated herein by reference in its entirety. Such amine-epoxy adducts are the products of the reaction between one or more amine compound(s) and one or more epoxy compound(s). Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted.

Suitable amine-epoxy adducts are available from commercial sources such as Ajinomoto, Inc., Air products, Adeka, Asahi Denka Kogyo K.K., and the Asahi Chemical Industry Company Limited. The products sold by Ajinomoto under the trademark AJICURE and by Air Products under the trademark AMICURE or ANCAMINE are especially preferred for use in the present invention.

Among the commercially available amine-epoxy adducts suitable for use in the present invention are AJICURE PN-H, AJICURE PN-23(J), AJICURE PN-40(J), AJICURE PN-50 (J), AJICURE PN-31, AMICURE 2014 AS, AMICURE 2014 FG, AMICURE 2337S, AMICURE 2441, AMICURE 2442, AJICURE MY-24, AJICURE MY-H, AJICURE MY-23, ADEKA HARDENER EH 4360S, ADEKA HARDENER EH 4370S, ADEKA HARDENER EH 3731 S, and ADEKA HARDENER EH 4357S.

Of course, combinations of different heat-activatable curing agents, such as combinations of different amine-epoxy adducts and/or combinations amine/(organo)borane complexes are also desirable for use herein.

At least one curing agent, such as at least one nitrogen-containing curing agent may be present in the inventive adhesive in an amount in the range of 0.1 to 5 wt. %, preferably in an amount in the range of 0.2 to 2.5 wt %, and more preferably in an amount in the range of 1 to 2 wt %, based on the total amount of the inventive adhesive.

In another embodiment the adhesive of the present invention further comprises one or more additives, such as plasticizers, oils, stabilizers, antioxidants, anti-corrosion agents, chelating agents, pigments, dyestuffs, polymeric additives, defoamers, preservatives, thickeners, rheology modifiers, humectants, adhesion promoters, dispersing agents, and water.

When used, additives are used in an amount sufficient to provide the desired properties. At least one additive may be present in the inventive adhesive in an amount in the range of about 0.05 to about 10 wt %, preferably in an amount in the range of about 1 to about 5 wt %, and more preferably in an amount in the range of about 2 to about 4 wt %, based on the total weight of the inventive adhesive. Of course, combinations of different additives are also desirable for use herein.

One typical formulation of the inventive adhesive comprises or consists of: a) from 3 to 25 wt % of at least one thermosetting resin, b) from 70 to 90 wt % of electrically conductive particles having an average particle size of 1 μm to 50 μm, c) from 0.3 to 5 wt % of at least one pre-dissolved or pre-dispersed metal precursor, wherein the metal precursor decomposes substantially to the corresponding metal during the thermal curing of the adhesive, d) from 0 to 5 wt % of at least one curing agent, and f) from 0 to 5 wt % of at least one additive.

The inventive adhesive, which is an electrically conductive adhesive, can find use as lead-free solder replacement technology, general interconnect technology, die attach adhesive, and so forth. Electronic devices, integrated circuits, semiconductor devices, solar cells and/or solar modules and other devices employing the present adhesive may be used in a wide variety of applications throughout the world, including energy production, personal computers, control systems, telephone networks, automotive electronics, displays, semiconductor packages, passive devices, and handheld devices.

When cured, the cured product of the thermally curable adhesive forms a stable electrical conductive interconnection between two surfaces, wherein said interconnection provides a good resistance to thermomechanical or mechanical fatigue and a high electrical conductivity and low contact resistance.

A further aspect of the present invention is the cured product of the thermally curable adhesive. The thermally curable adhesive of the present can preferably be cured in about 0.1 s to 180 minutes at a temperature within the range of about 50° C. to about 250° C., preferably within the range of about 70° C. to about 220° C., more preferably within the range of about 90° C. to about 200° C., and particularly preferably within the range of about 120° C. to 180° C.

In a preferred embodiment the inventive adhesive is cured at 120° C. to 180° C. in less than 180 minutes, preferably less than 60 minutes, and more preferably less than 15 minutes. The curing of the inventive adhesive can be performed by heating the formulation, e.g. by using IR lamps or conventional heating techniques.

Another aspect of the present invention is a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the adhesive of the present invention.

The term "substrate", as used herein, preferably refers to an electrode, wherein the inwardly facing surface of the electrode is in contact with the cured product of the thermally curable adhesive of the present invention.

In one embodiment of the present invention at least one inwardly facing surface has a surface area of less than 5000 $\mu m^2$, preferably less than 1000 $\mu m^2$, and more preferably less than 100 $\mu m^2$. Preferably, the inwardly facing surfaces of both substrates have a surface area of less than 5000 $\mu m^2$, preferably less than 1000 $\mu m^2$ and more preferably less than 100 $\mu m^2$.

The term "surface area", as used herein, refers to the total surface area based on the macroscopic dimensions of the surface, wherein the roughness of the surface is neglected.

It is a particular advantage of the present invention that the cured product of the adhesive can form a stable electrically conductive interconnection having a low contact resistance between the inwardly facing surfaces of two substrates, such as two electrodes, even if the contact area of one or both inwardly facing surfaces is small, which means that the surface area of the inwardly facing surface is less than 5000 $\mu m^2$, preferably less than 1000 $\mu m^2$, and more preferably less than 100 $\mu m^2$.

At least one of the substrates can be selected from metals, such as metal firing pastes, aluminum, tin, molybdenum, silver, and conductive metal oxides such as indium tin oxide (ITO), fluorine doped tin oxide, aluminum doped zinc oxide, etc. Further suitable metals include copper, gold, palladium, platinum, aluminum, indium, silver coated copper, silver coated aluminum, tin, and tin coated copper. Preferably both substrates are selected from one of the aforementioned materials.

EXAMPLES

1. Preparation of the Metallic Precursors
1.1 Preparation of Metal Precursor 1

2.58 g of N-octylamine were added to a solution of 1.7 g silver acetate in 0.47 mL butylglycolacetate/oleic acid 19/1–. The resulting reaction mixture was stirred for 1 min at 22° C. to form the desired metal precursor 1 which was directly used as a pre-dissolved compound without any further purification.

1.2 Preparation of Metal Precursor 2

2.58 g of N-octylamine were added to a solution of 1.7 g silver acetate in 3.74 mL butylglycolacetate/oleic acid 19/1–. The resulting reaction mixture was stirred for 1 min at 22° C. to form the desired metal precursor 2 which was directly used as a pre-dissolved compound without any further purification.

1.3 Preparation of Metal Precursor 3

2.58 g of N-octylamine were added to a solution of 1.7 g silver acetate in 3.74 mL butylglycolacetate. The resulting reaction mixture was stirred for 1 min at 22° C. to form the desired metal precursor 3 which was directly used as a pre-dissolved compound without any further purification.

2. Adhesive Formulations

Different adhesives according to the invention and comparative formulations were made by using the following components of Table 1.

TABLE 1

| | |
|---|---|
| Epoxy resin 1 | ALBIFLEX 348; thermosetting epoxy silicone resin from Hanse Chemie |
| Epoxy resin 2 | EPALLOY ® 5000; epoxidized hydrogenated Bisphenol A from CVC specialty chemicals Inc. |
| Epoxy resin 3 | EPALLOY ® 5200; cycloaliphatic glycidyl ester from CVC specialty chemicals Inc. |
| MSECP | AA-1922 from Metalor Technologies Micronsized electrically conductive particles having a volume average particle size (D50) of 15 $\mu m$ |
| MP1 | Metal precursor 1 |
| MP2 | Metal precursor 2 |
| MP3 | Metal precursor 3 |
| DDSA | Curing agent; Dodecyl succinic anhydride (CAS No.: 26544-38-7) |
| Anchor 1115 | Curing agent Amine boron trifluoride complex (Air products) |
| n-octylamine | Curing agent |
| butylglycolacetate | solvent |

The adhesives of the present invention and comparative formulations were prepared by simply mixing the aforementioned components.

The quantities of each component of the inventive and comparative formulations are given in Table 2 and 3 in parts by weight.

The adhesive formulation and the cured products of the adhesive formulations were characterized by using the following analytical methods:

Viscosity

The viscosity was measured at 25° C. using an AR 1000 rheometer from TA instruments. For the measurement, a 2 cm plate geometry and a 200 micron gap was used. The shear rate applied was 15 $s^{-1}$.

Volume Resistivity

The volume resistivity was determined in the following manner: aliquots of the prepared formulations were drawn down the surface of glass slides giving strips with strip dimensions of 5 cm length, 5 mm width and approximately 50 micron thickness and then placed in a pre-heated oven at 120° C. and than the oven was heated to 180° C. and the material was cured at this temperature for 30 minutes. After curing the strips were approximately 0.005 to 0.03 cm thick. Resistance was determined by measuring the voltage (V) drop along a 5 cm strip while passing current (I) through the strip, (R=V/I). Three separate strips were prepared and measured for resistance and dimensions. The volume resistivity (Rv) was calculated for each strip using the formula Rv=(R(w)(t)/L) where R is the electrical resistance of the sample in ohms measured using an ohmmeter or equivalent resistance measuring device, w and t are the width and thickness of the sample, in centimeters, and L is the distance in centimeters between the electrical conductors of the resistance measuring device. Volume resistivity units are reported in Ohm-cm.

Electrical Contact Resistance

The electrical contact resistance was measured on a ceramic test board with 100 Au finished electrodes. The electrodes have a width of 40 μm and are spaced apart 140 microns of each other. Between the electrodes a 40 μm thick polymer layer is applied to create a via area that the formulations need to fill to contact the electrodes at the bottom. The formulation was applied with a thickness of 200 μm and a width of approximately 2 mm across the length of the test board. The formulation was placed in a pre-heated oven at 120° C. and then the oven was heated to 180° C. and the material was cured at this temperature for 30 minutes. After curing and cooling down to 20° C. the electrical contact resistance was measured across 50 pairs of electrodes. The average contact resistance (arithmetic average) is reported in mOhm.

Tables 2 and 3 also denote the properties of the (cured) formulations. The viscosities of the inventive formulations and the comparative formulations were evaluated. In addition, the electrically conducting properties of the cured products of the inventive formulations and the cured products of the comparative formulations were evaluated by determining the volume resistivity and contact resistance.

TABLE 2 electrically conductive adhesives and comparative formulations

| | 1 | 2[a] | 3 | 4[a] | 5[a] | 6 |
|---|---|---|---|---|---|---|
| Epoxy resin 1 | 1.60 | 1.60 | 1.60 | 1.60 | 1.60 | 1.60 |
| MSECP | 12.80 | 12.80 | 16.00 | 16.00 | 16.00 | 16.00 |
| MP1 | 0.94 | — | — | — | — | — |
| MP2 | — | — | 2.00 | — | — | — |
| MP3 | — | — | — | — | — | 2.00 |
| DDSA | 0.40 | 0.40 | 0.40 | 0.40 | — | — |
| n-octylamine | — | — | — | — | 0.64 | — |
| butylglycolacetate | — | — | — | 0.30 | — | — |
| Viscosity [Pa s] | 340.8 | 215.4 | 27.1 | 106.1 | 12.1 | 11.3 |
| Volume resistivity [Ohm · cm] | 3.52E−04 | 1.66E−03 | 5.22E−05 | 6.99E−05 | 7.40E−05 | 4.98E.05 |
| Contact resistance [mOhm] | 479 | 31706 | 514 | n.d. | n.d. | 403 |

[a]comparative formulation
n.d.: not determined

TABLE 3

Electrically conductive adhesives and comparative formulations

| | 7 | 8 | 9[a] |
|---|---|---|---|
| Epoxy resin 2 | 1.28 | 1.28 | 1.28 |
| Epoxy resin 3 | 0.32 | 0.32 | 0.32 |
| MSECP | 12.80 | 12.80 | 12.08 |
| MP1 | 0.94 | — | — |
| MP3 | — | 0.94 | — |
| Anchor 1115 | 0.12 | 0.09 | 0.09 |
| Viscosity [Pa s] | 71.6 | 81.3 | 86.9 |
| Volume resistivity [Ohm · cm] | 3.24E−05 | 4.15E−05 | 283E−05 |
| Contact resistance [mOhm] | 674 | 762 | >1000000 |

[a]comparative formulation

In Table 2, the comparison of formulations 1 and 2 shows that the addition of metal precursor 1 significantly reduces the volume resistivity and the contact resistance, while formulations 3 and 6 demonstrate that the addition of metal precursor 2 or 3 leads to adhesive formulations which exhibit a reduced contact resistance.

In Table 3, the comparison of formulations 7, 8 and 9 shows that the addition of metal precursor 1 and 3 significantly reduces the contact resistance and do not negatively affect the volume resistance.

The invention claimed is:

1. A thermally curable adhesive comprising:
   a) at least one thermosetting resin;
   b) electrically conductive particles having an average particle size of 1 to 50 μm wherein the electrically conductive particles are present in the amount of 80 to 87 wt %, based on the total amount of the thermally curable adhesive; and
   c) at least one silver precursor comprising reaction products of silver carboxylate and at least one primary or secondary amine-containing ligand, wherein the silver precursor has a decomposition temperature that is less than the cure temperature of the at least one thermosetting resin.

2. The thermally curable adhesive according to claim 1, wherein the thermosetting resin is selected from epoxy resins, benzoxazine resins, acrylate resins, bismaleimide resins, cyanate ester resins, polyisobutylene resins and/or combinations thereof.

3. The thermally curable adhesive according to claim 1, wherein the thermosetting resin is selected from epoxy resins.

4. The thermally curable adhesive according to claim 1, wherein the total weight of all thermosetting resins in the thermally curable adhesive is in the range of 3 to 25 wt %, based on the total amount of the thermally curable adhesive.

5. The thermally curable adhesive according to claim 1, wherein the electrically conductive particles are selected from metal particles, metal plated particles or metal alloy particles and/or combinations thereof.

6. The thermally curable adhesive according to claim 1, wherein the electrically conductive particles are selected from copper, silver, platinum, palladium, gold, tin, indium, aluminum or bismuth, and/or combinations thereof.

7. The thermally curable adhesive according to claim 1, wherein the electrically conductive particles have an average particle size of 2 to 20 μm.

8. The thermally curable adhesive according to claim 1, wherein the electrically conductive particles are constructed from silver.

9. The thermally curable adhesive according to claim 1, wherein the at least one primary or secondary amine-containing ligand is an N-donor ligand selected from
primary or secondary amine-functionalized polyethers;
primary amines of formula:

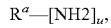

wherein u is an integer from 1 to 4, and $R^a$ is a saturated or partially unsaturated linear, branched or cyclic hydrocarbon residue, comprising 4 to 22 carbon atoms;
secondary amines of formula

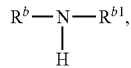

wherein $R^b$ and $R^{b1}$ are independently selected from saturated or partially unsaturated linear, branched or cyclic hydrocarbon residues, comprising 3 to 22 carbon atoms.

10. The thermally curable adhesive according to claim 1, wherein the silver precursor is in the form of a pre-mix dissolved or dispersed in a liquid amine-containing ligand.

11. The thermally curable adhesive according to claim 10, wherein the pre-dissolved or predispersed silver precursor is present in the thermally curable adhesive in an amount of 0.3 to 7 wt %, based on the total amount of the thermally curable adhesive.

12. The thermally curable adhesive according claim 1, wherein the silver precursor has a decomposition temperature in the range of about 70° C. to about 220° C.

13. A cured product comprising the thermally curable adhesive according to claim 1.

14. A bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of claim 13.

15. The bonded assembly according to claim 14, wherein at least one inwardly facing surface has a surface area of less than 5000 μm².

16. The thermally curable adhesive according to claim 9, further comprising:
tertiary amines of formula

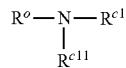

wherein $R^o$, $R^{c1}$ and $R^{c11}$ are independently selected from saturated or partially unsaturated linear, branched or cyclic hydfocarbon residues, comprising 3 to 22 carbon atoms.

* * * * *

UNITED STATES PATENT AND TRADEMARK OFFICE
CERTIFICATE OF CORRECTION

PATENT NO. : 10,000,671 B2
APPLICATION NO. : 13/838991
DATED : June 19, 2018
INVENTOR(S) : Liesbeth Theunissen and Gunther Dreezen It is certified that error appears in the above-identified patent and that said Letters Patent is hereby corrected as shown below:

In the Specification

Column 1, Line 60, change "0.1" to --0.1 s--

In the Claims

Column 18, Line 34, Claim 16 change "hydfocarbon" to --hydrocarbon--

Signed and Sealed this
Seventh Day of May, 2019

Andrei Iancu
*Director of the United States Patent and Trademark Office*